US005569426A

United States Patent [19]
Le Blanc

[11] Patent Number: 5,569,426
[45] Date of Patent: Oct. 29, 1996

[54] METHOD OF PRODUCING LIGHTWEIGHT CEMENT BLOCKS

[75] Inventor: Frank X. Le Blanc, Dieppe, Canada

[73] Assignee: Enviro Products Ltd., Dieppe, Canada

[21] Appl. No.: 246,444

[22] Filed: May 20, 1994

[51] Int. Cl.⁶ .................................................. B28C 7/04
[52] U.S. Cl. ........................ 264/122; 106/731; 106/737; 264/69; 264/426
[58] Field of Search ..................... 264/122, 69, 426; 106/731, 737

[56] References Cited

U.S. PATENT DOCUMENTS

| | | |
|---|---|---|
| 2,504,579 | 4/1950 | Perl . |
| 2,899,325 | 8/1959 | Kranz et al. . |
| 3,869,295 | 3/1975 | Bowles et al. ........................ 264/54 |

FOREIGN PATENT DOCUMENTS

| | | |
|---|---|---|
| 86899 | of 1903 | Canada . |
| 137669 | 1/1912 | Canada . |
| 163970 | 7/1915 | Canada . |
| 231313 | 5/1923 | Canada . |
| 241494 | 8/1924 | Canada . |
| 277217 | 1/1928 | Canada . |
| 1235712 | 4/1988 | Canada . |
| 253549 | 1/1988 | Germany . |

OTHER PUBLICATIONS

Bulletin Research and Development Science and Technology, Supply and Services Canada, No. 219, Jun. 1991.
Derwent Publications Ltd., London, GB; Monolit Sci. Des. Cons. Assoc. Sep. 7, 1993 abstract only.
Stepan, Sestak; Stepan, Karel, Czech.—manufacture of multicomponent building material; Chemical Abstracts Jun. 13, 1990 abstract only 115:55763z.

Chemical Engineer's Handbook, fifth edition, ©1973 pp. 3–90,91.

Primary Examiner—Robert A. Dawson
Assistant Examiner—Kenneth M. Jones
Attorney, Agent, or Firm—Arne I. Fors; Jeffrey T. Imai; Dale E. Schlosser

[57] ABSTRACT

A lightweight cement block and a method of producing the lightweight cement block, comprising the steps of mixing three parts by volume sawdust with water to form a first mixture having a relative moisture content in the range of 40% to 44%; adding one part by volume sand to the first mixture to form a second mixture; mixing the second mixture with water until the relative moisture content of the second mixture is in the range of 40% to 44%; adding one part by volume cement to the second mixture to form a third mixture; mixing the third mixture with water until the relative moisture content is in the range of 40% to 44%; forming the third mixture into a block. The resultant block comprises sawdust in the range of 30% to 70% by volume, sand in the range of 10% to 40% by volume and cement in the range of 10% to 40% by volume.

15 Claims, 1 Drawing Sheet 5,569,426

METHOD OF PRODUCING LIGHTWEIGHT CEMENT BLOCKS

FIELD OF THE INVENTION

This invention relates to cement blocks and more particularly, relates to lightweight cement blocks comprising sawdust, sand and cement and a method of producing the same.

BACKGROUND OF THE INVENTION

Cement blocks are commonly used in the construction industry. Since cement is a heavy substance, it is desirable to make cement blocks lighter for ease of use and to help prevent injury to workers caused by lifting the blocks.

Various methods have been proposed in the prior art to form lightweight cement blocks utilizing sawdust as a component. The addition of sawdust, however, tends to interfere with the setting of the-cement as sawdust tends to absorb water from the mixture. The presence of sawdust weakens the bonds in the cement and frequently decreases the setting time of the blocks. Sawdust also decreases the strength of cement blocks and increases flammability.

The methods for forming lightweight cement blocks have included the addition of a number of other substances to the sawdust cement mixture—such as alum, lime, asbestos, iron rods, calciumoxychloride and sodium hydroxide. The products produced by these methods are complicated and expensive thus limiting commercial sales.

SUMMARY OF THE INVENTION

The disadvantages of the prior art may be overcome by providing a method for producing a lightweight cement block comprising sawdust, cement and water which is strong and substantially non-flammable by controlling the relative moisture content of the mixture during the formation of the cement blocks.

The method for making lightweight cement blocks comprises mixing three parts by volume sawdust with water to form a first mixture having a relative moisture content in the range of 40% to 44%, preferably 42%, adding one part by volume sand to the first mixture to form a second mixture, mixing the second mixture with water until the relative moisture content of the second mixture is in the range of 40% to 44%, preferably 42%, adding one part by volume cement to the second mixture to form a third mixture, mixing the third mixture with water until the relative moisture content is in the range of 40% to 44%, preferably 42%, and forming the third mixture into a block.

During preparation of the blocks, the relative moisture content of the sawdust and of the sawdust-sand mixture is sufficient to enable the grains of sand to stick to the sawdust. The relative moisture content of the sawdust and of the sawdust-sand mixture is also sufficient to prevent cracking of the resultant blocks, but is not so much as to wash the grains of sand out of the mixture during the preparation of the blocks.

In one embodiment of the invention, the method for making a resultant mixture and forming said resultant mixture into a lightweight cement block comprises the steps of mixing sawdust in the range of 30% to 70%, preferably 60%, by volume of the resultant mixture with water to form a first mixture having a relative moisture content in the range of 40% to 44%, adding sand in the range of 10% to 40% by volume of the resultant mixture to form a second mixture, mixing the second mixture with water until the relative moisture content is in the range of 40% to 44%, adding cement with the second mixture in the range of 10% to 40% by volume to the resultant mixture to form a third mixture, mixing the third mixture with water until the relative moisture content is in the range of 40% to 44% to form the resultant mixture, and forming the resultant mixture into a block. Soap may also be added to the sawdust, sand, cement mixture to assist in the removal of the blocks from molds. During forming, the blocks are vibrated and compacted so that uniform blocks are produced.

The resultant blocks are 3 parts sawdust, 1 part sand and 1 part cement.

DETAILED DESCRIPTION OF THE PREFERRED EMBODIMENT

In the preferred embodiment, about three cubic feet of sawdust are placed into a paddle mixer. The paddle turns inside the mixer to mix the components. The sawdust is preferably a product of soft woods such as pine or spruce. Hardwood should not used because hardwood will not absorb water fast enough for efficient production of the cement blocks. Sawdust particle sizes of 0.02–0.5 inch (0.5–12 mm) diameter have been found to be the most effective in the manufacture of the blocks. Larger particle sizes do not hold together very well during the manufacture and often pull out of the blocks after drying.

Figure 1:
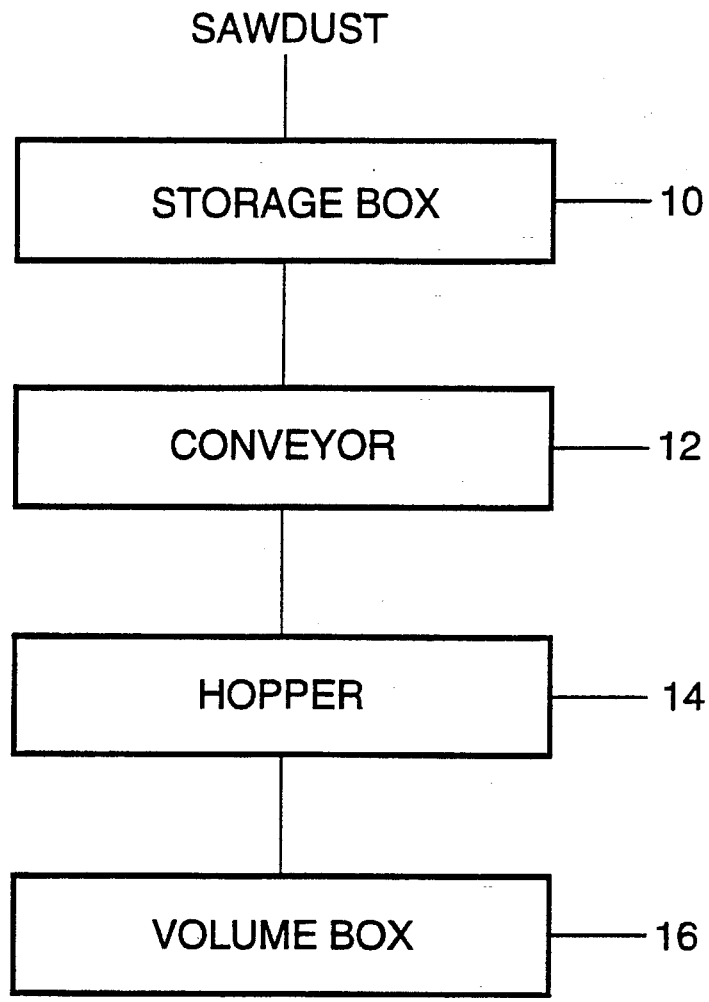
FIG. 1 is a flow chart of the method of segregating the sawdust to a relatively uniform density used in forming the cement block of the present invention.

The raw sawdust is transported to volume boxes by the process shown in the flow chart of FIG. 1. The sawdust is placed in storage box 10 and transported to hopper 14 by conveyor belt 12. The sawdust flows through hopper 14 and is dispensed in sized volume boxes 16. The separation of the sawdust by the above method enables sawdust of relatively uniform density to be used in the formation of the lightweight cement blocks of the present invention.

Water is added to the sawdust in the mixer until the moisture content of a first mixture of sawdust and water is in the range of 40% to 44%, and is preferably 42%. The moisture content is monitored by a humidity probe such as those known as MIX-MIZER™. By keeping the moisture content in this range, the sawdust is not soaked in the water beyond the point that natural sugars in the wood are extracted.

Once the sawdust is at the desired moisture content, about one cubic foot of sand is added into the mixer, forming a second mixture of sawdust and sand. The type of sand used is preferably pit sand which has a diameter of approximately 0.01–0.15 inches (0.2–4 mm). The pit sand is preferably unwashed. Beach sand should not be used because the grain size is too coarse for mixing and usually contains salt which can adversely affect the bonding in the resulting cement block.

The second mixture is mixed with sufficient water to keep the relative moisture content of the mixture in the range of 40% to 44%, and preferably at 42%. This relative moisture content level allows grains of sand to stick to the sawdust, without washing the sand off the sawdust. The moisture content of the second mixture is also sufficient to prevent the finally produced block from cracking due to poor bonding of the cement.

The particles of sawdust are effectively coated with a layer of sand. Coating of the sand enhances the bonding of the cement, as the cement and sawdust are separated from each other by the sand, and the sawdust, therefore, cannot draw much water out of the cement as it bonds and cures. Coating of the sawdust with sand is also believed to retard the tendency of the block to burn.

About one cubic foot of cement, preferably PORT-LAND™ cement, is then added to the second mixture of sawdust-sand immediately after the moisture content of the mixture has reached the range of 40% to 44%, and preferably 42%. This forms a third mixture of sawdust, sand and cement. The cement, sawdust and sand of the third mixture are mixed thoroughly and the moisture content is maintained in the range of 40% to 44%, preferably 42%. The third mixture is then poured into molds to form the lightweight cement blocks such as block 18 of FIG. 2.

One cup of powdered soap or a lubricant such as KRETE MIX™ may be added to the third mixture prior to pouring the third mixture into molds. The soap or lubricant lubricates the blocks, thereby allowing relatively easy removal from the molds.

Figure 2:
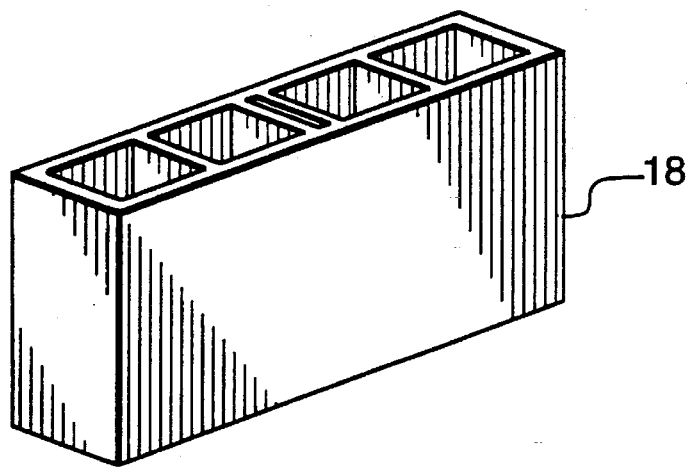
FIG. 2 is a perspective view of the cement block of the present invention.

The third mixture is vibrated and compacted in the molds at 1500–3000 r.p.m. for 1–6 seconds forming essentially uniform blocks such as block 18 shown in FIG. 2. A COLUMBIA™ block machine is suitable to form the mixture into blocks. This block machine utilizes hydraulic pressure and air pressure to compact the block. Vibration settles and compresses the third mixture preventing the sawdust of the third mixture to rise.

The third mixture is compacted to a sufficient degree by hydraulic pressure in the range of 900–4860 p.s.i. and air pressure in the range of 100–3400 p.s.i. Care should be exercised to prevent the block from being over-compacted. Over-compaction increases the risk that expansion of the uppermost portion of the block will occur after compaction, causing packing problems.

The blocks are cured for a period of 24 hours in a room at a temperature in the range of 50° to 80° F. (10°–28° C.), preferably 70° F. (21° C.) and having a humidity in the range of 40% to 80%.

In the preferred embodiment, the blocks are in a ratio of 3:1:1 sawdust to sand to cement.

The percentage of sawdust in the blocks by volume may vary between 30% and 70%, preferably 60%. The percentage of sand in the blocks by volume is between 10% and 40%, and is preferably 20%. The percentage of cement in the blocks by volume is between 10% and 40%, preferably 20%. The more sand used in the block the stronger the block will be.

The following combustibility test examples of the cement blocks made by the method of the present invention are included to further illustrate the invention herein described and claimed. The examples are not intended as limitations of the present invention.

The test specimens were prepared according to the above method. An approximately 25 mm thick slice of the cement block was subjected to these tests. The face of the material tested was an existing external surface of the block.

EXAMPLE 1

A small-scale test was conducted using a cone-calorimeter according to ASTM E1354 "Standard Test Method for Heat and Visible Smoke Release Rates for Materials and Products Using an Oxygen Consumption Calorimeter". The tests were conducted under two different heat flux levels; 50 kW/m$^2$ and 75 kW/m$^2$.

There was no apparent ignition or visible smoke. At 75 kW/m$^2$, the sample lost 6.2% of its mass during 10 minutes of exposure.

EXAMPLE 2

Small-scale tests were conducted using the LIFT™ apparatus according to ASTME1321-90 "Standard Test Method for Determining Material Ignition and Flame Spread Properties". The ASTM standard requires the determination of a minimum heat flux for ignition, below which the material will not ignite. An ignition time flux profile is obtained for a range of heat fluxes above this minimum. A rate of flame spread is normally conducted at a heat flux level 5 kW/m$^2$ above the minimum heat flux for ignition.

An approximately 25 mm thick slice of the cement block was subjected to these tests. The face of the material tested was an existing external surface of the block.

Radiative heat fluxes up to 65 kW/m$^2$ were used. No apparent ignition or flame attachment to specimens was observed during the test. No apparent flame spread on the surface of the test specimens was observed.

EXAMPLE 3

A full-scale room burn test was conducted according to the proposed ASTM standard "Room Fire Test of Wall and Ceiling Materials and Assemblies". The test was conducted in a standard room facility with dimensions of 2.4 m×3.6 m and a height of 2.4 m. The ignition source was initially adjusted to produce 40 kW exposure in accordance with the test method. After 5 minutes, the ignition source was increased to 160 kW, as flashover did not occur during the first 5 minutes. The contribution of the test material to fire growth was measured in terms of the time history of the incident heat flux on the center of the floor, the time history of the temperature of the gases in the upper part of the room, the time to flashover, and the rate of heat release.

The burn room underlining material was removed before lining with the supplied cement building blocks. The final dimensions of the room were 2.3 m×3.5 m and a height of 2.4 m.

No apparent ignition or combustion of the test material was observed.

EXAMPLE 4

A full-scale room burn test was conducted according to the ISO DIS 9705 "Room Fire Test in Full Scale for Surface Products". This test was conducted in a room, 2.4 m×3.6 m and a height of 2.4 m. The ignition source (propane burner) was set at 10 kW for the initial 10 minutes and increased to 300 kW for the next 5 minutes in accordance with the test method. The rate of heat release from the test material, volume flow in the exhaust duct, production of carbon monoxide, production of carbon dioxide, and light obscuring smoke are evaluated from the test measurement data.

The burn room underlining material was removed before lining with the supplied cement building blocks. The burn room ceiling was lined with the sliced blocks to minimize room height reduction. The final dimensions of the room were 2.3 m×3.5 m and a height of 2.4 m. No apparent ignition or combustion of the test material was observed.

EXAMPLE 5

A small-scale non standard furnace test was conducted to determine the fire endurance of the wood-fiber concrete blocks. This furnace test employed the standard time-temperature curve specified in the Canadian standard CAN/ULC-S101-M89—"Standard Methods of Fire Endurance Tests of Building Construction and Materials". The test conditions used were similar to that standard, except that a much smaller surface area was exposed to the fire conditions. The surface area exposed to fire conditions was approximately 825 mm by 825 mm.

The test area of the furnace was fitted with the wood-fiber concrete building blocks as supplied.

The wood-fiber concrete blocks provided a fire resistance rating of 100 minutes. At 100 minutes the unexposed side single-point wall temperature exceeded the permissible limit set out in the CAN/ULC-S101-M89 standard. The average wall temperature exceeded the permissible limit at 104 minutes.

The Examples above illustrate that the cement blocks of the present invention did not ignite during any of the tests.

It will be understood that modifications can be made in the embodiment of the invention herein without departing from the scope and purview of the invention as described by the appended claims.

I claim:

1. A method of producing a lightweight cement block, comprising the steps:

mixing three parts by volume sawdust with water to form a first mixture having a relative moisture content in the range of 40% to 44%, by volume;

adding one part by volume sand to the first mixture to form a second mixture;

mixing the second mixture with water until the relative moisture content of the second mixture is in the range of 40% to 44%, by volume;

adding one part by volume cement to the second mixture to form a third mixture;

mixing the third mixture with water until the relative moisture content is in the range of 40% to 44%, by volume;

forming the third mixture into a block.

2. A method of producing a lightweight cement block as claimed in claim 1 wherein said sawdust is segregated in substantially uniform density.

3. A method of producing a lightweight cement block as claimed in claim 1 wherein the sand is pit sand.

4. A method of producing a lightweight cement block as claimed in claim 1 wherein the sawdust is a softwood.

5. A method of producing a lightweight cement block as claimed in claim 1 wherein the sawdust is selected from a group consisting of spruce and pine.

6. A method of producing lightweight concrete blocks as defined in claim 1 wherein the relative moisture content of the second mixture is sufficient to enable the grains of sand to stick to the sawdust.

7. A method of producing lightweight concrete blocks as claimed in claim 1 wherein the relative moisture content of the first mixture is 42%, by volume.

8. A method of producing lightweight concrete blocks as claimed in claim 1 wherein the relative moisture content of the second mixture is 42%, by volume.

9. A method of producing lightweight concrete blocks as claimed in claim 1 wherein the relative moisture content of the third mixture is 42%, by volume.

10. A method of producing lightweight concrete blocks as claimed in claim 1, additionally comprising the step of adding soap to the third mixture prior to the forming of blocks to enable the blocks to be easily removed from molds.

11. A method of producing lightweight concrete blocks as claimed in claim 1, additionally comprising the step of vibrating the block during formation to a degree sufficient to form the same, but not to a degree which will cause the sawdust to rise towards an uppermost surface of the block.

12. A method of producing lightweight concrete blocks as claimed in claim 1 additionally comprising the step of curing the block for a period of twenty-four hours in an environment in the range of 50° F.–70° F. and having a relative humidity in the range of 40%–80%.

13. A method of producing a lightweight concrete block as claimed in claim 1 wherein the sawdust particle size is about 5/16ths of an inch.

14. A method of producing a resultant mixture and forming said resultant mixture into a lightweight cement block comprising the steps:

mixing sawdust in the range of 30% to 70% by volume of said resultant mixture with water to form a first mixture having a relative moisture content in the range of 40% to 44%, by volume;

adding sand in the range of 10% to 40% by volume of the resultant mixture to form a second mixture;

mixing the second mixture with water until the relative moisture content is in the range of 40% to 44%, by volume;

adding cement to the second mixture in the range of 10% to 40% by volume to the resultant mixture to form a third mixture;

mixing the third mixture with water until the relative moisture content is in the range of 40% to 44% to form the resultant mixture;

forming the resultant mixture into a block.

15. A method of producing a resultant mixture and forming said resultant mixture into a cement block comprising the steps:

mixing 60% sawdust by volume of said resultant mixture with water to form a first mixture having a relative moisture content of 42%, by volume;

adding 20% sand by volume of the resultant mixture to form a second mixture;

mixing the second mixture with water until the relative moisture content is 42%, by volume;

adding 20% cement by volume of the resultant mixture to the second mixture to form a third mixture;

mixing the third mixture with water until the relative moisture content is 42%, by volume to form the resultant mixture;

forming the resultant mixture into a block.

* * * * *